United States Patent [19]

Mori et al.

[11] 4,004,853

[45] Jan. 25, 1977

[54] EXPOSURE METER CIRCUIT

[75] Inventors: Chiharu Mori; Masahiro Kawasaki, both of Tokyo, Japan

[73] Assignee: Asahi Kogaku Kogyo Kabushiki Kaisha, Tokyo, Japan

[22] Filed: Sept. 3, 1975

[21] Appl. No.: 610,506

[30] Foreign Application Priority Data

Sept. 3, 1974 Japan .............................. 49-101164

[52] U.S. Cl. .............................. 356/226; 354/23 R
[51] Int. Cl.[2] .......................................... G01J 1/44
[58] Field of Search ........ 356/226; 354/60 E, 60 R, 354/60 L, 23 R

[56] References Cited

UNITED STATES PATENTS 3,723,014  3/1973  Nanba ................................ 356/226
3,888,594  6/1975  Ichiyanagi ........................ 356/226

Primary Examiner—John K. Corbin
Assistant Examiner—Stewart Levy
Attorney, Agent, or Firm—Sughrue, Rothwell, Mion, Zinn & Macpeak

[57] ABSTRACT

An exposure meter circuit is disclosed in which the photoreceptor may be either a photovoltaic element such as a photodiode or a photoconductive element such as a CdS element. The meter is able to provide an indication of various exposure determining factors such as object brightness, shutter speed, aperture, or a fixed point for alignment by appropriate choice of circuit values.

20 Claims, 1 Drawing Figure

U.S. Patent    Jan. 25, 1977    4,004,853
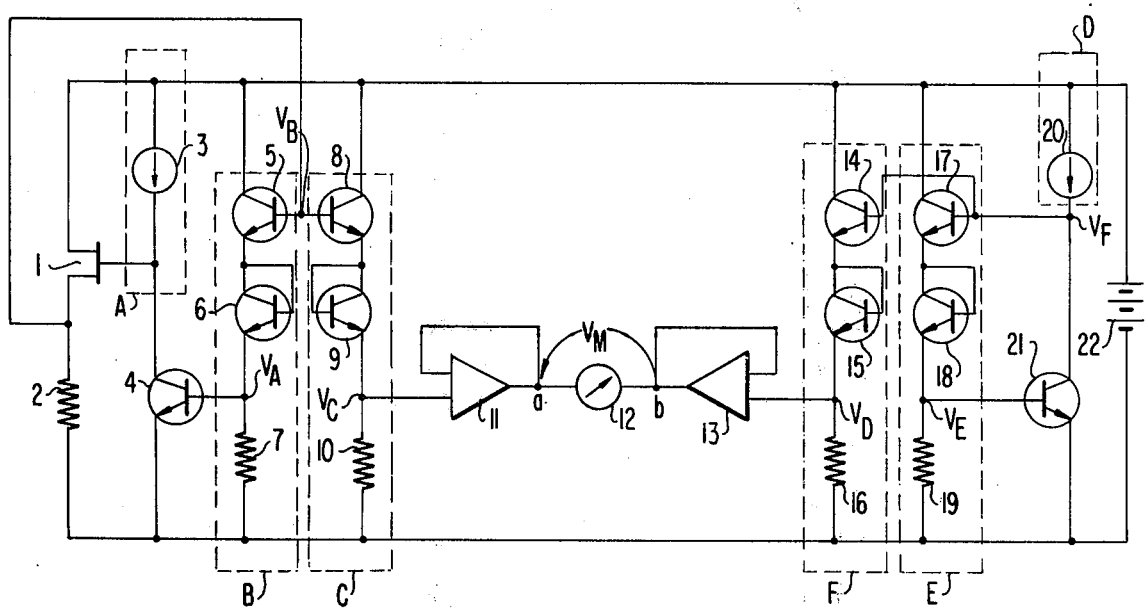

EXPOSURE METER CIRCUIT

BACKGROUND OF THE INVENTION

1. Field of the Invention

This invention relates to an exposure meter in which it is possible to use either a photovoltaic element such as a photodiode or a photoconductive element such as a CdS element as a photoreceptor, and it is possible to indicate as an indication exposure determining factors such as apex indication Bv of the brightness of the object B, apex indication Tv of the shutter speed T and apex indication Av of the aperture size, and it is also possible to indicate alignment of marks (generally, of fixed points).

2. Description of the Prior Art

There have been a number of proposals regarding exposure meter circuits employing a photovoltaic element such as a photodiode or a photoconductive element such as a CdS element. It has not been proposed, however, to provide an exposure meter circuit which is capable of using either a photovoltaic element or a photoconductive element due to the difference in physical properties therebetween.

In the photovoltaic type photoreceptor, when used with inverse bias, the photocurrent $i_p$ is $$i_p = K_1 B^{\gamma_1} \qquad 1.$$

where $B$ is the brightness of the object, $K_1$ is a proportional constant and $\gamma_1$ is a constant, and in the photoconductive type photoreceptor, the resistance $Rcds$ is $$Rcds = K_2 B^{-\gamma_2} \qquad 2.$$

where $K_2$ is a proportional constant and $\gamma_2$ is a constant. That is, there is a difference between the above two types of photoreceptors that in the photovoltaic element the amount of light is converted to a current and in the photoconductive element it is converted to a resistance. Further, in the former, the constant $\gamma_1$ is $\gamma_1 = 1$ when a photodiode is used, and in the latter, the constant $\gamma_2$ is $\gamma_2 = 0.5$–1 when CdS is used. In other words, in a photovoltaic element, the photocurrent is proportional to the brightness of the object $B$ and in the photoconductive element the resistance is proportional to ½ –1/1 power of the brightness of the object B. In addition, in contrast to that the photocurrent handled in the photoconductive element is several tens of pA to several tens of $\mu$A, the photocurrent handled in the photovoltaic element is several $\mu$A to several mA. Owing to these differences between the photovoltaic element and the photoconductive element, it has been very difficult to provide an exposure meter circuit which is capable of using both types of photoreceptors.

SUMMARY OF THE INVENTION

This invention enables both the photocurrents to be taken out in the form of a sum which is logarithmically compressed, i.e., $$S = K_3 \log i_p + K_3 \log V_1/Rcds \qquad 3.$$

where $K_3$ is a proportional constant and $V_1$ is a constant voltage. When a photovoltaic element is used, the $Rcds$ is made fixed (or a resistance determined by another exposure determining factor), and when a photoconductive element is used, the $I_p$ is made fixed (or a current determined by another exposure determining factor). Further, the present invention provides an exposure meter which is able to indicate various information such as Bv, Tv, Av and a fixed point for alignment.

BRIEF DESCRIPTION OF THE DRAWING

The specific nature of the invention, as well as other objects, aspects, uses and advantages thereof, will clearly appear from the following description and from the accompanying drawing, in which the sole FIGURE shows a circuit of a preferred embodiment of the invention.

DESCRIPTION OF THE PREFERRED EMBODIMENT

Now the present invention will be described in detail with reference to a preferred embodiment thereof.

A field effect transistor 1 forms together with a resistance 2 a source-follower circuit, and receives as its input the collector output of a transistor 4 which is connected at its collector with a constant current source 3. The output of the field effect transistor 1 is connected with the base of a transistor 5 which forms an emitter-follower circuit together with a transistor 6 and a resistor 7. Transistor 6 is diode connected with its base and collector connected in common. The output of the field effect transistor 1 is also connected with the base of a transistor 8 which forms an emitter-follower circuit together with a transistor 9 and a resistor 10. Transistor 9 is also diode connected with its base and collector connected in common. An operational amplifier 11 forms a voltage-follower circuit and is connected with a connecting point between the transistor 9 and the resistor 10 to receive the output therefrom as the input. A meter 12 is connected with the output terminal $a$ thereof.

On the other hand, the collector of a transistor 21 which is connected at its collector with a constant current source 20 is connected with the base of a transistor 17 which forms an emitter-follower circuit together with a transistor 18 and a resistor 19. Transistor 18 is diode connected with its base and collector connected in common. The connecting point between the transistor 18 and the resistor 19 is connected with the base of the transistor 21 to form a feed-back circuit. Similarly, the base of a transistor 14 which forms an emitter-follower circuit together with a transistor 15 and a resistor 16 is connected with the collector of the transistor 21. Transistor 15 is diode connected like transistor 18. An operational amplifier 13 forms a voltage follower and is connected with a connecting point between the transistor 15 and the resistor 16 to receive the output therefrom as the input. The output terminal $b$ thereof is connected with the meter 12. The reference numeral 22 designates a constant voltage source such as a battery.

The circuit constructed as described above operates as follows. The transistor 4 connected with the constant current source 3 is provided with a feed back through its collector to base by way of the source-follower circuit including the field effect transistor 1 and the emitter-follower circuit including the transistor 5. Thus, the base-emitter voltage $V_A$ of the transistor 4 is $$V_A = h \cdot \log(i_1/i_s) \qquad 4.$$

where $h = K \cdot T/q$ wherein $K$ is Boltzmann constant, $T$ is the absolute temperature, $q$ is the quantity of electric charge, and $I_s$ is the saturated current inversely flowing between the base and emitter of the transistor 4.

As the transistors 5, 6, 8, 9, 14, 15, 17, 18 and 21, log-compression type transistors like said transistor 4 in which the base and the emitter are connected by PM junction are employed. Where the current flowing through the transistors 5 and 6 is $i_2$ and the resistance of the resistor 7 is $R_1$, $$i_2 = V_A/R_1 \qquad 5.$$

and the base voltage $V_B$ of the transistor 5 is $$V_B = V_A + 2h \cdot \log(i_2/I_s) \qquad 6.$$

and where the emitter voltage of the transistor 9 is $V_C$ and the resistance of the resistor 10 is $R_2$, the current $i_3$ flowing through the transistors 8 and 9 is $$i_3 = V_C/R_2 \qquad 7.$$

and accordingly, the emitter voltage $V_C$ of the transistor 9 is $$V_C = V_B - 2h \cdot \log(i_3/I_s) \qquad 8.$$

Similarly, the transistor 21 connected with the constant current source 21 is provided with a feed back through its collector to base by way of the emitter follower circuit employing said transistor 17. The voltage between the base and the emitter $V_E$ of the transistor 21 is $$V_E = h \cdot \log(i_4/I_s) \qquad 9.$$

where the current of the constant current source 20 is $i_4$, and the current $i_5$ flowing through the transistors 17 and 18 is $$i_5 = V_F/R_3 \qquad 10.$$

where $R_3$ is the resistance of the resistor 19, and the base voltage $V_F$ of the transistor 17 is $$V_F = V_E + 2h \cdot \log(i_5/I_s) \qquad 11.$$

and where the emitter voltage of the transistor 15 is $V_D$ and the resistance of the resistor 16 is $R_4$, the current $i_6$ flowing through the transistors 14 and 15 is $$i_6 = V_D/R_4 \qquad 12.$$

and accordingly, the emitter voltage $V_D$ of the transistor 15 is $$V_D = V_F - 2h \cdot \log(i_6/I_s) \qquad 13.$$

Since the operational amplifiers 11 and 13 are formed into the voltage-follower circuit and accordingly the input voltage and the output voltage are equal to each other, the voltage $V_M$ across the opposite ends of the meter 12 can be represented as follows in view of the above formulae (4), (6), (8), (9), (11) and (13)

$$V_M = V_D - V_C = h \cdot \log(i_4/I_s) + 2h \cdot \log(i_5/I_s) - 2h \cdot \log(i_6/I_s) - h \cdot \log(i_1/I_s) - 2h \cdot \log(i_2/I_s) + 2h \cdot \log(i_3/I_s). \qquad 14.$$

Since the fluctuation in current of the currents $i_2$, $i_3$, $i_5$, $i_6$ corresponding to the voltage fluctuation of the voltages $V_A$, $V_C$, $V_D$, $V_E$ is very small, it can be said that $V_A \approx V_C \approx V_D \approx V_E$ in the formulae (5), (7), (10), (12) and the voltage $V_M$ between the opposite terminals of the meter can be represented as follows in view of the formulae (5), (7), (10), (12), (14)

$$V_M = h \cdot \log i_4 - 2h \cdot \log R_3 + 2h \cdot \log R_4 - h \cdot \log i_1 + 2h \cdot \log R_1 - 2h \cdot \log R_2 \qquad 15.$$

When a photovoltaic type photoreceptor is used and the indication of $T_V$ is to be performed, a photodiode instead of the constant current source 3 is connected with the cathode thereof connected with the (+)-terminal of the source 22 and with the anode thereof connected with the collector of the transistor 4. If the resistor 7 is set to have a resistance of the function of $Av$ and the resistor 19 is set to have a resistance of the function of $Sv$ corresponding to film sensitivity, i.e., $$i_1 = i_p = K_1 B = K_4 2^{Bv} \qquad 16.$$

$$R_1 = K_5 2^{1/2Av} \qquad 17.$$

$$R_3 = K_6 2^{1/2Sv} \qquad 18.$$

where $K_4$, $K_5$ and $K_6$ are proportional constants, the voltage $V_M$ between the opposite terminals $a$ and $b$ of the meter 12 can be represented as follows in view of the formulae (15), (16), (17), (18)

$$V_M = -\frac{h}{\log_2 e}(Bv + Sv - Av) + h \cdot \log\left(\frac{i_4}{K_6{}^2} \cdot \frac{R_4{}^2}{K_4} \cdot \frac{K_5{}^2}{R_2{}^2}\right) = -K_7(Tv - \log_2 K_8) \qquad (19)$$

where $$K_7 = h/\log_2 e$$

and $$K_8 = i_4/K_6{}^2 \cdot (R_4{}^2/K_4) \cdot (K_5{}^2/R_2{}^2).$$

As is apparent from the formula (19), the voltage across the terminals of the meter is proportional to $Tv$ since $K_7$ and $K_8$ are constants. Therefore, by setting the constant $K_8$ properly, the point where the voltage across the terminals is zero can be determined. Thus, $Tv$ can be indicated by the meter with the zero point made the standard level.

Though the above description has been made regarding the case where $Tv$ is indicated, it will be understood that the similar results can be obtained in cases where $Av$ or $Bv$ is indicated.

When a photoconductive type photoreceptor is used, a CdS element is connected instead of the resistor 7 and the indication is made in a fixed point alignment system. In this case, the resitors 10, 16 and 19 are made to correspond to $Sv$, $Tv$, and $Av$, respectively. When the resistances are set as follows, $$R_1 = R_{cds} = K_9 B^{-\gamma} = K_9 2^{-\gamma 2 Bv} \qquad 20.$$

$$R_2 = K_{10} 2^{Sv} \qquad 21.$$

$$R_3 = K_{11} 2^{-Av} \qquad 22.$$

$$R_4 = K_{12} 2^{Tv} \qquad 23.$$

where $K_9$, $K_{10}$, $K_{11}$ and $K_{12}$ are proportional constants, the voltage across the terminals of the meter $V_M$ can be represented as follows in view of the formulae (15), (20), (21), (22), and (23)

$$V_M = \frac{2\gamma_2 h}{\log_2 e} \cdot [Av + Tv - (Bv + Sv)]$$
$$+ h \cdot \log\left(\frac{i_4}{i_1}\right) \cdot \left(\frac{K_{12}^2}{K_{11}^2}\right) \cdot \left(\frac{K_9^2}{K_{10}^2}\right) \quad (24).$$

If it is set that $$(i_4/i_1)\cdot(K_{12}^2/K_{11}^2)\cdot(K_9^2/K_{10}^2) = 1, V_M = K_7[Av + Tv - (Bv + Sv)] \quad 25.$$

As apparent from the formula (25), when $Av + Tv - (Bv + Sv) = 0$, the terminal voltage of the meter becomes zero. Thus, it becomes possible to make an exposure meter of fixed point alignment type.

One example of the relation between the variables and the kind of the photoreceptor and the value indicated is shown in Table 1 which shows a case where a photodiode is employed and in Table 2 which shows a case where a CdS element is employed.

TABLE 1

| Variable Indication | 3 | 7 | 10 | 16 | 19 | 20 |
|---|---|---|---|---|---|---|
| Bv | Photodiode | Contr. | Fix | Fix | Fix | Fix |
| Tv | Photodiode | Av | Contr. | Fix | Sv | Fix |
| Av | Photodiode | Tv | Contr. | Fix | Sv | Fix |
| Fixed Point | Photodiode | Av | Contr. | Tv | Sv | Fix |

TABLE 2

| Variable Indication | 3 | 7 | 10 | 16 | 19 | 20 |
|---|---|---|---|---|---|---|
| Bv | Fix | CdS | Contr. | Fix | Fix | Fix |
| Tv | Fix | CdS | Sv | Contr. | Av. | Fix |
| Av | Fix | CdS | Sv | Tv | Contr. | Fix |
| Fixed Point | Contr. | CdS | Sv | Tv | Av | Fix |

In the above tables, $Sv$, $Iv$, $Av$ indicate the value of the exposure determining factors, respectively. Fix indicates a fixed current source or resistance. Contr. indicates a variable current source or resistance.

The above tables show one example of the relation between the variables and the kind of the photoreceptor and the value indicated. It will be understood that the object of the present invention can be accomplished similarly to the results as shown in the above tables even if the variables are interchanged with one another.

Further, in the case where $Tv$ or $Av$ is indicated, an exposure meter of follower needle type can be provided by providing a needle which is moved by manual operation in correspondence to the shutter speed or the aperture size of a diaphragm.

As described herein above, in accordance with the present invention, either an exposure meter which employs a photovoltaic element or an exposure meter which employs a photoconductive element can be provided. Further, as for the information indicated, either $Bv$, $Tv$, $Av$ or fixed point alignment can be indicated in the exposure meter. Furthermore, if the main portion of the circuit of this invention (excluding the constant current sources 3, 20, resistors 7, 10, 16, 19 and meter 12) is made into an integrated circuit and a photoreceptor and the type of information indicated are properly selected with reference to the characteristic of the exposure meter by use of the integrated circuit, it is possible to shorten the manufacturing period, lower the cost of the whole circuit, enhance the reliability of the circuit, and so forth.

Further, it will be readily understood by those skilled in the art that the exposure meter in accordance with the present invention can be used as an illumination meter. It will therefore be apparent that the embodiment shown in only exemplary and that various modifications can be made in construction and arrangement within the scope of the invention as defined in the appended Claims. For example, the source-follower circuit including field effect transistor 1 could be replaced by an emitter-follower circuit. The CdS element could be substituted for resistances 10 or 19 instead of load resistance 7. Other modifications and variations will be apparent to those skilled in the art.

We claim:

1. An exposure meter circuit comprising:
   a. a first transistor having base, collector and emitter electrodes, the emitter of said first transistor being connected to a source of reference potential;
   b. a first current source connected to the collector of said first transistor; and first current source comprising a photovoltaic device such as a photodiode corresponding to a first exposure determining factor;
   c. a first emitter-follower circuit connected between the collector and base of said first transistor to form a feed back circuit, the emitter current of said first emitter-follower circuit corresponding to a second exposure determining factor and providing logarithmic compression;
   d. a second emitter-follower circuit connected to receive the output at the collector of said first transistor, the emitter current of said second emitter-follower corresponding to a third exposure determining factor and providing logarithmic compression;
   e. a second transistor having base, collector and emitter electrodes, the emitter of said second transistor being connected to a source of reference potential;
   f. a second current source connected to the collector of said second transistor, said second current source corresponding to a fourth exposure determining factor;
   g. a third emitter-follower circuit connected between the collector and base of said second transistor to form a feed back circuit, the emitter of said third emitter-follower circuit corresponding to a fifth exposure determining factor and providing logarithmic compression; and
   h. indicating means connected between the output of said second-emitter-follower circuit and the output from the collector of said second transistor for providing an indication of a desired exposure determining factor.

2. An exposure meter as recited in claim 1 further comprising a source-follower circuit connected between the collector of said first transistor and said first emitter-follower.

3. An exposure meter as recited in claim 1 wherein said second current source is a constant current source.

4. An exposure meter as recited in claim 3 further comprising a fourth emitter-follower circuit connected between said indicating means and the collector of said second transistor, the emitter current of said fourth emitter-follower circuit corresponding to a sixth exposure determining factor and providing logarithmic compression.

5. An exposure meter as recited in claim 4 wherein each of said first, second, third and fourth emitter-follower circuits comprises a transistor having base, collector and emitter electrodes, and a load resistance connected to said emitter, the input to the emitter-follower circuit being applied to the base of said transistor and the output being taken across said load resistance.

6. An exposure meter as recited in claim 5 wherein each of said first, second, third and fourth emitter-follower circuits further comprise diode means connected between the emitter of said transistor and said load resistance.

7. An expsoure meter as recited in claim 5 wherein said indicating means provides an indication of object brightness, the load resistance of said first emitter-follower circuit is variable, and the load resistances of said second, third and fourth emitter-follower circuits are fixed.

8. An exposure meter as recited in claim 5 wherein said indicating means provides an indication of shutter speed, the load resistance of said first emitter-follower circuit has a value corresponding to aperture, the load resistance of said second emitter-follower circuit is variable, the load resistance of said third emitter-follower circuit has a value corresponding $t$ film sensitivity, and the load resistance of said fourth emitter-follower is fixed.

9. An exposure meter as recited in claim 5 wherein said indicating means provides an indication of aperture, the load resistance of said first emitter-follower circuit has a value corresponding to the shutter speed, the load resistance of said second emitter-follower circuit is variable, the load resistance of said third emitter-follower circuit has a value corresponding to film sensitivity, and the load resistance of said fourth emitter-follower circuit is fixed.

10. An exposure meter as recited in claim 5 wherein said indicating means provides a fixed point indication, the load resistance of said first emitter-follower circuit has a value corresponding to aperture, the load resistance of said second emitter-follower circuit is variable, the load resistance of said third emitter-follower circuit has a value corresponding to film sensitivity, and the load resistance of said fourth emitter has a value corresponding to shutter speed.

11. An exposure meter circuit comprising:
 a. a first transistor having base, collector and emitter electrodes, the emitter of said first transistor being connected to a source of reference potential;
 b. a first current source connected to the collector of said first transistor; said first current source corresponding to a first exposure determining factor;
 c. a first emitter-follower circuit connected between the collector and base of said first transistor to form a feed back circuit, said first emitter-follower including a photoconductive device such as CdS element as a load resistance, the emitter current of said first emitter-follower circuit corresponding to a second exposure determining factor and providing logarithmic compression;
 d. a second emitter-follower circuit connected to receive the output at the collector of said first transistor, the emitter current of said second emitter-follower corresponding to a third exposure determining factor and providing logarithmic compression;
 e. a second transistor having base, collector and emitter electrodes, the emitter of said second transistor being connected to a source of reference potential;
 f. a second current source connected to the collector of said second transistor, said second current source corresponding to a fourth exposure determining factor;
 g. a third emitter-follower circuit connected between the collector and base of said second transistor to form a feed back circuit, the emitter current of said third emitter-follower circuit corresponding to a fifth exposure determining factor and providing logarithmic compression; and
 h. indicating means connected between the output of said second-emitter-follower circuit and the output from the collector of said second transistor for providing an indication of a desired exposure determining factor.

12. An exposure meter as recited in claim 11, further comprising a source-follower circuit connected between the collector of said first transistor and said first emitter-follower.

13. An exposure meter as recited in claim 11, wherein said second current source is a constant current source.

14. An exposure meter as recited in claim 11, further comprising a fourth emitter-follower circuit connected between said indicating means and the collector of said second transistor, the emitter current of said fourth emitter-follower circuit corresponding to a sixth exposure determining factor and providing logarithmic compression.

15. An exposure meter as recited in claim 11, wherein each of said first, second, third and fourth emitter-follower circuits further comprise diode means connected between the emitter of said transistor and said load resistance.

16. An exposure meter as recited in claim 11, wherein each of said first, second, third and fourth emitter-follower circuits comprises a transistor having base, collector and emitter electrodes, and a load resistance connected to said emitter, the input to the emitter-follower circuit being applied to the base of said transistor and the output being taken across said load resistance.

17. An exposure meter as recited in claim 16 wherein said indicating means provides an indication of object brightness, said first current source is a constant current source, the load resistance of said second emitter-follower circuit is variable, and the load resistances of said third and fourth emitter-follower circuits are fixed.

18. An exposure meter as recited in claim 16 wherein said indicating means provides an indication of shutter speed, said first current source is a constant current source, the load resistance of said second emitter-follower circuit has a value corresponding to film sensitivity, the load resistance of said third emitter-follower circuit has a value corresponding to aperture, and the load resistance of said fourth emitter-follower is variable.

19. An exposure meter as recited in claim 16 wherein said indicating means provides an indication of aperture, said first current source is a constant current source, the load resistance of said second emitter-follower circuit has a value corresponding to film sensitivity, the load resistance of said third emitter-follower circuit is variable, and the load resistance of said fourth emitter-follower circuit has a value corresponding to shutter speed.

20. An exposure meter as recited in claim 16 wherein said indicating means provides a fixed point indication, said first current source is variable, the load resistance of said second emitter-follower has a value corresponding to film sensitivity, the load resistance of said third emitter-follower has a value corresponding to aperture, and the load resistance of said fourth emitter-follower has a value corresponding to shutter speed.

* * * * *